United States Patent [19]

Short

[11] Patent Number: 5,046,129
[45] Date of Patent: Sep. 3, 1991

[54] REDUCING PHASE ERROR IN RECEIVED FM MULTIPLEX SIGNAL

[75] Inventor: William R. Short, Ashland, Mass.

[73] Assignee: Bose Corporation, Framingham, Mass.

[21] Appl. No.: 301,162

[22] Filed: Jan. 24, 1989

[51] Int. Cl.$^5$ .......................... H04B 1/10; H04B 7/01; H04H 5/00

[52] U.S. Cl. ........................................ 455/72; 381/13; 381/106; 455/214; 455/259; 455/304; 455/337

[58] Field of Search ...................... 455/38, 45, 72, 206, 455/209, 214, 257, 260, 267, 304, 306, 309, 259, 263, 295, 296, 303, 312; 381/13, 106; 375/80; 329/306, 319, 358

[56] References Cited

U.S. PATENT DOCUMENTS

| | | | |
|---|---|---|---|
| 4,602,380 | 7/1986 | Stebbings | 381/13 |
| 4,752,955 | 6/1988 | Torick | 381/13 |
| 4,769,841 | 9/1988 | Cugnini | 381/13 |
| 4,771,464 | 9/1988 | Kadin et al. | 381/13 |
| 4,809,328 | 2/1989 | Usui et al. | 381/13 |
| 4,817,151 | 3/1989 | Bod et al. | 381/13 |
| 4,852,167 | 7/1989 | Usui et al. | 381/13 |

Primary Examiner—Reinhard J. Eisenzopf
Assistant Examiner—Chi H. Pham
Attorney, Agent, or Firm—Fish & Richardson

[57] ABSTRACT

A receiver for receiving a transmitted signal comprising first and second bandwidth limited component signals modulating a single high frequency carrier in phase quadrature with the first component signal as originally transmitted including an identification signal has a source of a reference signal subject to phase error. Circuitry combines the received transmitted component signals with the reference signal to provide first and second demodulated signals characteristic of the first and second component signals respectively. A detector responds to the first and second demodulated signals to provide first and second detected components of the identification signal. Feedback circuitry responds to the detected components of the identification signal by providing a correction signal that is applied to the source of reference signal to reduce the phase error.

11 Claims, 1 Drawing Sheet

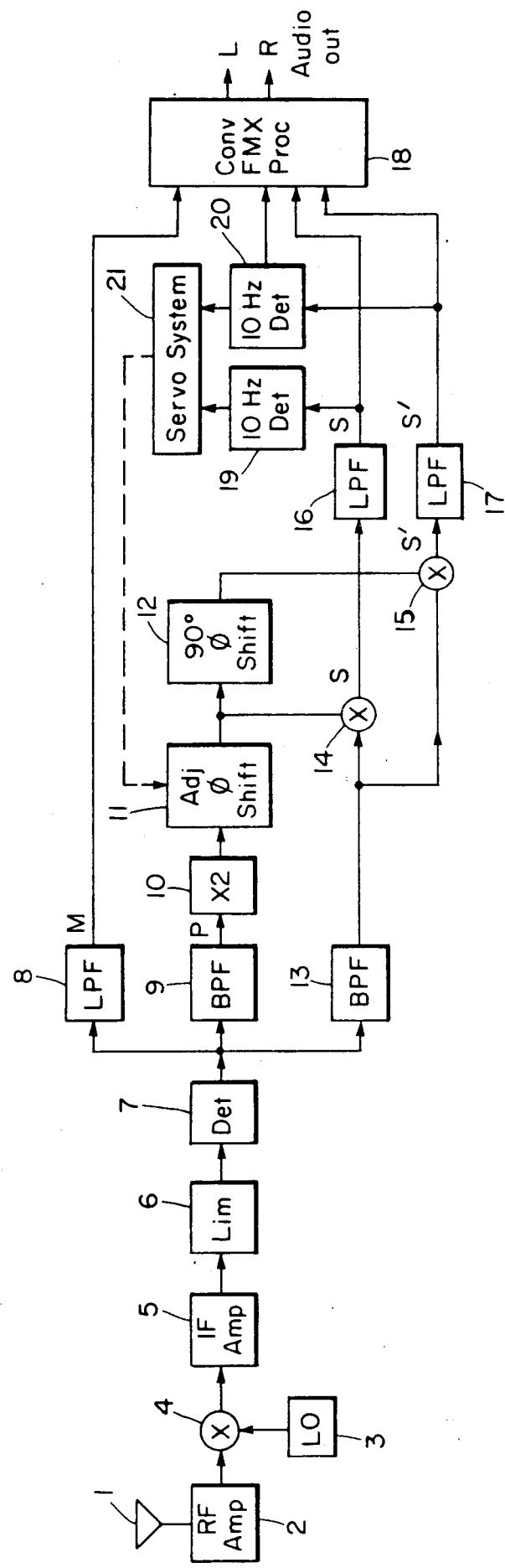

REDUCING PHASE ERROR IN RECEIVED FM MULTIPLEX SIGNAL

BACKGROUND OF THE INVENTION

This invention relates to reducing phase error in received composite low frequency information on a high frequency carrier, such as transmitted by an FMX broadcast system.

The FMX system transmits the three standard components of a conventional FM stereo broadcast. These components are: (1) the M signal, which is the mono-compatible baseband audio signal, comprised of the sum of the left and right audio signals (L+R), frequency modulated onto the high frequency carrier; (2) the S signal, which is the difference between the left and right audio signals (L−R) modulated onto a 38 kHz subcarrier using double-sideband suppressed carrier (DSB-SC) modulation; and (3) the P signal which is a pilot 19 kHz subcarrier used by the receiver to regenerate a 38 kHz sub-carrier or reference signal for demodulating the S signal. The FMX system adds a fourth signal called the S' signal, which is also derived from the difference between the left and right audio signals (L−R), but is filtered, compressed, and DSB−SC modulated onto the 38 kHz subcarrier in phase quadrature with the S signal. The S' signal is normally not detected by a conventional FM stereo receiver. An FMX receiver, however, uses the S' signal instead of the S signal. The S' signal is marked by a 10 Hz identification tone. FMX receivers may use the S signal to derive the compression algorithm used to compress the dynamic range of the S' signal, which allows for adaptive expansion of the dynamic range in the receiver. U.S. Pat. No. 4,485,483 entitled "FM Stereophonic System Incorporating Companding of Difference Signal" of Torick et al. and the articles entitled "Improving the Signal-to-Noise Ratio and Coverage of FM Stereophonic Broadcasts" in 33 J. Audio. Eng. Soc. 938 (Dec. 1985) and "Reentrant Compression and Adaptive Expansion for Optimized Noise Reduction," 33 J. Audio Eng. Soc. 944 (Dec. 1985) describe the FMX broadcast service.

SUMMARY OF THE INVENTION

Multipath transmissions of FMX broadcast signals produce audible distortion in both conventional and FMX receivers. The invention reduces this distortion.

The invention generally features a receiving system comprising: a means for demodulating two input signals subject to phase errors, where one signal is identified by an identification signal; a means for detecting the identification signal to provide an error signal representative of phase error; and feedback circuitry connected to the detection means responsive to the error signal for reducing phase error.

The inventive system receives a composite stereo signal on a radio frequency carrier, such as FMX. All FM stereo systems are affected by degradation due to multipath reception. These effects manifest themselves as poor demodulation of the difference signals S and S' caused by phase errors between the pilot subcarrier P and the S and S' subcarrier. This system reduces these errors by detecting the strength of the 10 Hz identification tone and using variable phase-shift circuitry and feedback to reduce phase errors.

Other features and advantages will become apparent from the following detailed description when read in connection with the accompanying drawing,

BRIEF DESCRIPTION OF THE DRAWINGS the single figure of which is a block diagram of a receiver according to the present invention.

DETAILED DESCRIPTION

Multipath transmissions cause phase shift between the pilot signal P and the subcarrier signal S. Since the pilot is used in the receiver to generate the 38 kHz reference signal for demodulating the S and S' signals, this phase shift causes a phase error in the regenerated 38 kHz reference signal. As a result of the phase quadrature relation between the S and S' signals, this phase error in the 38 kHz reference signal results in the S demodulator being sensitive not only to S, but also S'. Similarly, the S' demodulator is sensitive not only to S' but also S. Thus, under multipath conditions, the S output of both FMX and conventional receivers is corrupted by the S' signal, and the S' signal is corrupted by the S signal in FMX receivers. Under certain conditions, which have been observed in the field, the S and S' signals can exchange places, as the phase shift between P and S approaches 90 degrees.

The distortion caused by these demodulation errors is especially severe because the amplitude of the S' signal is usually much higher than the S signal due to the compression. When S and S' signals corrupt each other, the level and frequency response of the decoded difference channel is incorrect. The amplitude error can be as great as 14db, the amount of compression used in the prior art systems. With a stationary receiver, the reproduced audio level, the reproduced frequency response, and the width of the stereo soundstage can all vary with transmitted level. With a receiver in a moving vehicle, the audible effect is one of "barking", where the level of the received audio suddenly increases considerably in level and then decreases to normal level as the receiver moves through a multipath region.

The FMX system uses a low level 10 Hz tone as an identification tone in the S' signal only. An improved receiver according to the invention detects not only the 10 Hz ID signal in the S' signal, but also in the S signal. Presence of the tone in the S signal indicates that phase shift between P and S have caused the S and S' signals to corrupt each other. In this case, receiver circuitry varies the phase of the 38 kHz reference signal used to demodulate the S and S' signals to minimize the magnitude of 10 Hz ID tone in the S signal and thereby reduce phase error.

Referring to the drawing, there is shown a block diagram of a receiver according to the invention. The receiver comprises a number of conventional FM components including antenna 1, RF amplifier stage 2, local oscillator 3, mixer 4, IF amplifiers 5, limiter 6, and detector 7.

The detector output is applied to the low pass filter 8 to provide the M signal, and to bandpass filter 9 to provide the pilot signal. The pilot signal is applied to a frequency doubler 10, typically using a phase locked loop (PLL). The 38 kHz signal from the PLL is fed to an adjustable phase shift network 11. This network might be an adjustable RC network, or other adjustable time delay circuits. It is also possible to achieve the phase shift by altering the operating parameters of the PLL. The output of the phase shift network feeds a 90 degree phase shift network 12 to the S' signal.

The detector output is also applied to a bandpass filter 13 having a bandpass from 23 kHz to 53 kHz to provide the modulated S and S' signals. This modulated signal is fed to two demodulators 14 and 15 energized with quadrature components of the 38 kHz reference signal to provide the S and the S' signals, respectively. These audio signals are applied to low pass filters 16, 17, respectively and, along with the M signal, fed to a conventional FMX processor 18, for expansion and dematrixing.

The S and S' audio signals also feed 10 Hz detectors 19, 20, respectively to detect the ID tone. Such detectors might be PLL's, or they might simply be narrow 10 kHz bandpass filters followed by level detectors. The S' ID tone detector feeds the conventional FMX processor 18 to indicate the reception of an FMX broadcast. The S and S' ID tone detectors feed a servo system 21 which adjusts the phase of the 38kHz signal by feedback to the phase shift network 11 in order to minimize the magnitude of the ID tone in the S signal. The amount of required phase shift is proportional to the amplitude of ID tone in the S signal, while the polarity of the required phase shift is determined by the phase of the ID tone in the S signal compared to the phase of the ID tone in the S' signal. With a phase shift error in one direction, the ID tone recovered from the S signal and the ID tone recovered from the S' signal will be in phase, while in the other direction, they will be out of phase. A control voltage is developed to drive the phase shifter 11 in the correct direction to minimize presence of the ID tone in the S channel in accordance with well known techniques. It may be advantageous to constantly vary the phase at a slow rate in order to determine that a null has been reached in accordance with well known techniques.

Other embodiments are within the claims.

What is claimed:

1. A receiver for receiving a transmitted signal comprising first and second bandwidth limited component signals modulating a single high frequency carrier in phase quadrature with said first component signal as originally transmitted, said transmitted signal including an identification signal;
    said receiver comprising a source of a reference signal for demodulating the received transmitted signal and subject to introducing phase error when being used for said demodulating,
    means for combining the received transmitted component signals with said reference signal to provide first and second demodulated signals, characteristic of said first and second component signals respectively,
    means responsive to said demodulated signals for detecting said identification signal, and
    feedback means responsive to the detected identification signal for processing said reference signal to reduce said phase error.

2. A receiver in accordance with claim 1 wherein said feedback means comprises means responsive to the detected identification signal for reducing said phase error so as to reduce the magnitude of the detected identification signal in said second demodulated signal.

3. A receiver in accordance with claim 2 wherein said means responsive to the detected identification signal includes first and second identification signal detectors responsive to said first and second demodulated signals respectively for providing first and second components of said detected identification signal.

4. A receiver in accordance with claim 1 wherein said transmitted signal includes a pilot signal of frequency harmonically related to that of said single high frequency carrier and said source of a reference signal subject to introducing phase error comprises means responsive to said pilot signal for providing said reference signal.

5. A receiver in accordance with claim 4 wherein the frequency of said pilot signal is half that of said single high frequency carrier and said means responsive to said pilot signal comprises a frequency doubler.

6. A receiver in accordance with claim 1 wherein said identification signal is a subaudible tone of fixed frequency,
    and said means responsive to said demodulated signals for detecting said identification signal comprises a filter for selectively transmitting spectral components at the fixed frequency of said subaudible tone,
    and a detector coupled to said filter.

7. A receiver in accordance with claim 6 wherein said means responsive to said demodulated signals for detecting said identification signal includes means for providing an error signal representative of the magnitude of the detected identification signal in said second demodulated signal,
    said feedback means including means responsive to said error signal for providing a correction signal to said source of a reference signal to reduce said phase error so as to reduce the magnitude of the detected identification signal in said second demodulated signal.

8. A method of reducing phase error which method includes the steps of receiving a transmitted signal comprising first and second bandwidth limited component signals modulating a single high frequency carrier in phase quadrature with said first component signal as originally transmitted, said transmitted signal including an identification signal,
    processing the received transmitted signal to provide a reference signal subject to phase error,
    combining the received transmitted component signals with said reference signal to provide first and second demodulated signals characteristic of said first and second component signals respectively,
    detecting first and second components of said identification signal in said first and second demodulated signals respectively,
    processing the detected first and second components of the identification signal to provide a correction signal,
    and altering the phase of the reference signal in accordance with the correction signal to reduce the phase error.

9. A method in accordance with claim 8 wherein said transmitted signal also includes a pilot signal of frequency harmonically related to that of said single high frequency carrier,
    and processing the received pilot signal to provide said reference signal.

10. A method in accordance with claim 9 wherein the frequency of said pilot signal is half that of said single high frequency carrier and the step of processing the received pilot signal includes applying the detected pilot signal to a frequency doubler to provide said reference signal of frequency the same as that of said single high frequency carrier.

11. A method in accordance with claim 8 wherein processing the detected first and second components of the identification signal includes the steps of comparing the phase of the first detected component of the identification signal with that of the second detected component of the identification signal to control the polarity of said correction signal so as to effect alteration of the phase of said reference signal so as to reduce the magnitude of the second detected component of the identification signal.

* * * * *